(12) United States Patent  (10) Patent No.: US 7,775,340 B2
Hermann et al.  (45) Date of Patent: Aug. 17, 2010

(54) TRANSPORT STAR WHEELS

(75) Inventors: Klarl Hermann, Thalmassing (DE); Schoberl Wolfgang, Worth/Donau (DE)

(73) Assignee: Krones AG, Neutraubling (DE)

( * ) Notice: Subject to any disclaimer, the term of this patent is extended or adjusted under 35 U.S.C. 154(b) by 24 days.

(21) Appl. No.: 11/795,177

(22) PCT Filed: Jan. 13, 2006

(86) PCT No.: PCT/EP2006/000258

§ 371 (c)(1), (2), (4) Date: Apr. 2, 2008

(87) PCT Pub. No.: WO2006/077051

PCT Pub. Date: Jul. 27, 2006

(65) Prior Publication Data

US 2008/0257687 A1    Oct. 23, 2008

(30) Foreign Application Priority Data

Jan. 19, 2005   (DE) .................. 10 2005 002 510

(51) Int. Cl.
B65G 37/00 (2006.01)
B65G 47/00 (2006.01)
B65G 47/84 (2006.01)
B65G 47/86 (2006.01)
B65G 17/46 (2006.01)

(52) U.S. Cl. ............... 198/478.1; 198/469.1; 198/470.1

(58) Field of Classification Search ............. 198/478.1, 198/469.1, 470.1
See application file for complete search history.

(56) References Cited

U.S. PATENT DOCUMENTS

| 5,056,650 | A |   | 10/1991 | Kronseder et al. |
| 5,533,608 | A | * | 7/1996  | Adams et al. ............ 198/478.1 |
| 5,566,832 | A |   | 10/1996 | Stuckrad et al. |
| 5,582,285 | A | * | 12/1996 | Kronseder ............... 198/473.1 |

(Continued)

FOREIGN PATENT DOCUMENTS

DE    19539694    5/1996

(Continued)

OTHER PUBLICATIONS

International Preliminary Report on Patentability and Translated Written Opinion from PCT/EP2005/013165, mailed Jul. 3, 2007.

*Primary Examiner*—Gene Crawford
*Assistant Examiner*—Yolanda Cumbess
(74) *Attorney, Agent, or Firm*—Marshall, Gerstein & Borun LLP

(57) ABSTRACT

A transport star having at least one replaceable mounting part with a first locking element and a mounting part holder with a second locking element, and where one of the two locking elements is locked with the other locking element by rotation. In addition, a transport star having at least one replaceable mounting part that can be locked with a mounting part holder, and where a ring-shaped operating element is provided for locking the mounting part with the mounting part holder. Also, a transport star having at least one mounting part and a mounting part holder on which the mounting part can be positioned in a position predetermined by positioning devices, whereby the lifting of the mounting part can be prevented by the positioning devices.

8 Claims, 4 Drawing Sheets

U.S. PATENT DOCUMENTS

| | | |
|---|---|---|
| 6,336,766 B1 | 1/2002 | De Villele et al. |
| 2002/0021005 A1 | 2/2002 | Giovanni |

FOREIGN PATENT DOCUMENTS

| | | |
|---|---|---|
| DE | 195 17 210 | 11/1996 |
| DE | 20113038 | 10/2001 |
| EP | 0316001 | 5/1989 |
| EP | 0631561 | 1/1995 |
| EP | 1 452 429 A2 | 9/2004 |

\* cited by examiner

TRANSPORT STAR WHEELS

This is the U.S. national stage under 35 U.S.C. §371, of international application no. PCT/EP2006/000258, having an international filing date of Jan. 13, 2006, and claims priority to German application no. 10 2005 002 510.2 filed on Jan. 19, 2005.

FIELD OF THE DISCLOSURE

The disclosure relates to a transport star, such as used for handling containers, such as bottles.

BACKGROUND OF THE DISCLOSURE

Transport stars are used for transporting containers such as bottles. With transport stars, containers can be transported from one conveyor to another. To do so, the transport stars usually have mounting parts that have recesses to accommodate the containers.

The mounting parts may be exchanged to be able to adapt the transport stars to different container dimensions.

European Patent EP 0 316 001 discloses a transport star in which swivel bars can grip around a lower edge of a mounting part to prevent the mounting part from being removed.

European Patent EP 0 631 561 also discloses a device with which an angle lever can be pressed with a threaded bolt and a star grip against the top side of a star ring and a round rod, so that removal of the star ring is prevented.

SUMMARY OF THE DISCLOSURE

The object of the present invention is to improve upon these systems.

Due to the locking of two locking elements by rotation of one of same, fastening of a mounting part on a mounting part holder is possible with a relatively low mechanical complexity and yet a high precision.

By means of a ring-shaped operating element, it is possible to design the operating element so that broken glass and liquid can easily be conveyed further downward because the operating element leaves a great deal of room free.

A very compact design is possible by means of positioning devices on the mounting part holder with which it is possible to prevent the mounting part from being lifted up. It is also possible to eliminate the use of separate means that only prevent lifting or achieve a positioning effect. However, such means may nevertheless be provided. The positioning means may at the same time serve as a locking means.

An embodiment in which the transport star has spokes is also advantageous because this makes it possible to easily remove broken glass and liquids because there are large openings between the spokes. It is also advantageous to provide the locking element at the end of the spoke to thereby obtain the most compact possible design.

Furthermore, a supporting element with which an operating element can be supported on the mounting part holder is also advantageous because this prevents bending of the operating element due to great loads.

It is advantageous if the operating element is arranged above the mounting part holder and/or surrounding an axis of rotation of the transport star, because this permits easy access to the operating element.

It is also advantageous if several locking devices which can be locked to the operating element are provided, because in this way, several locks can be locked by operating just one operating element to thereby achieve a secure hold of the mounting part on the mounting part holder.

According to another advantageous embodiment, the mounting part holder is designed in two parts, so that it can be attached in a form-fitting manner, so it is clamped on a central middle part, in particular a shaft. This embodiment has the advantage that a transport star can be secured on shafts or the like that are already present. This achieves a space-saving design. Furthermore, through this design is it possible to have the simplest possible construction where space is limited. It is thus possible to clamp the mounting part holders from the side in the case of shafts that are not accessible from above.

It is of course also possible for the mounting part holder to be designed with three, four or more parts. These variants having more than two parts are necessary, e.g., when it is extremely difficult to gain access to the middle parts to which the parts are to be mounted.

It is advantageous—especially in the case of mounting part holders in several parts—if at least one locking element per part is secured by a thread, for example, on the spokes of the mounting part holder, for example, so that the operating element with the locking elements attached to it cannot be removed from the mounting part holder toward the outside and/or the locking elements do not change their positions with respect to the central middle part in the radial direction unintentionally.

BRIEF DESCRIPTION OF THE DRAWINGS

Embodiments of a transport star are illustrated in the accompanying figures, in which.

DETAILED DESCRIPTION OF THE DISCLOSURE

Figure 1:
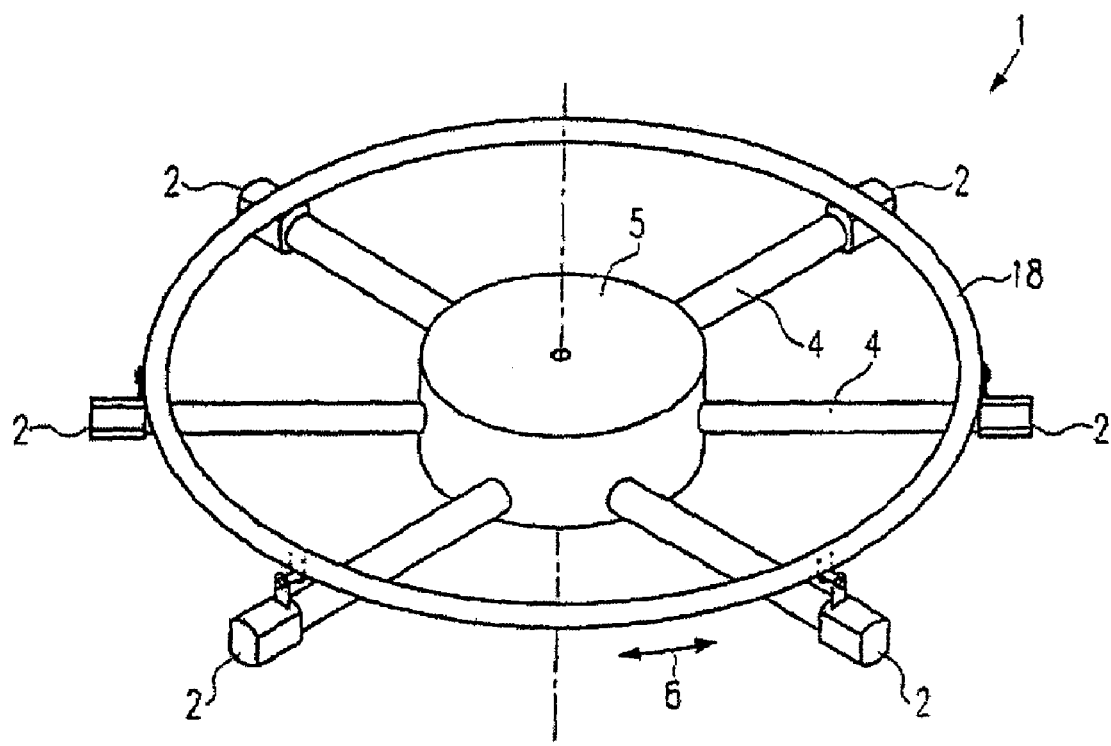
FIG. 1 shows a schematic three-dimensional diagram of a mounting part holder.

FIG. 1 shows a mounting part holder 1. The mounting part holder 1 comprises locking elements 2 on which a mounting part may sit. The locking elements 2 are provided at the ends of spokes 4, which are in turn held by a hub 5. By rotation of the hub 5, mounting parts sitting on the locking elements 2 are made to rotate.

The locking elements 2 thus serve here, first of all, to position the mounting part and, secondly, to secure the mounting part, which is also secured in this position by the locking option, however.

FIG. 1 also shows an operating element 18, which is in the form of a ring. The ring is passed by the locking elements 2. With the operating element 18, the locking elements 2 can be rotated, as described in greater detail below. This is accomplished by moving the operating element 18 in the direction of the arrow 6. The operating element 18 surrounds the axis of rotation of the mounting part holder 1, shown with dotted lines in FIG. 1.

Figure 2:
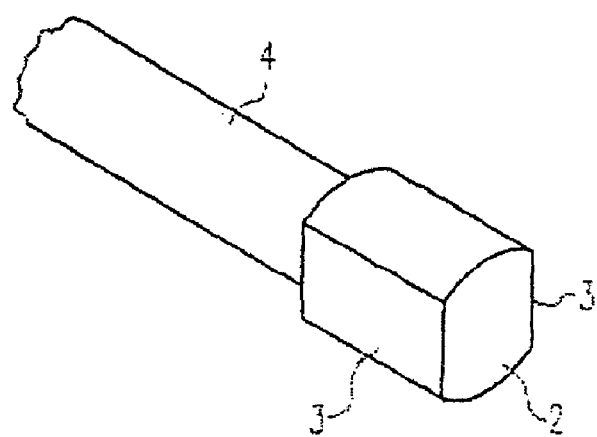
FIG. 2 shows a three-dimensional schematic diagram of a locking element.

FIG. 2 shows an enlarged detail of the locking element 2. The locking element 2 has a larger diameter than the spoke 4 and is placed on it. Between the locking element 2 and the spoke 4, a lubricant such as a grease, a plastic ring (e.g., made of Teflon) or the like may be provided. The locking element 2 has an essentially circular cross section, but it also has flattened areas 3 on two sides. In principle, it is also possible for a flattened area 3 to be provided on just one side.

Figure 3:
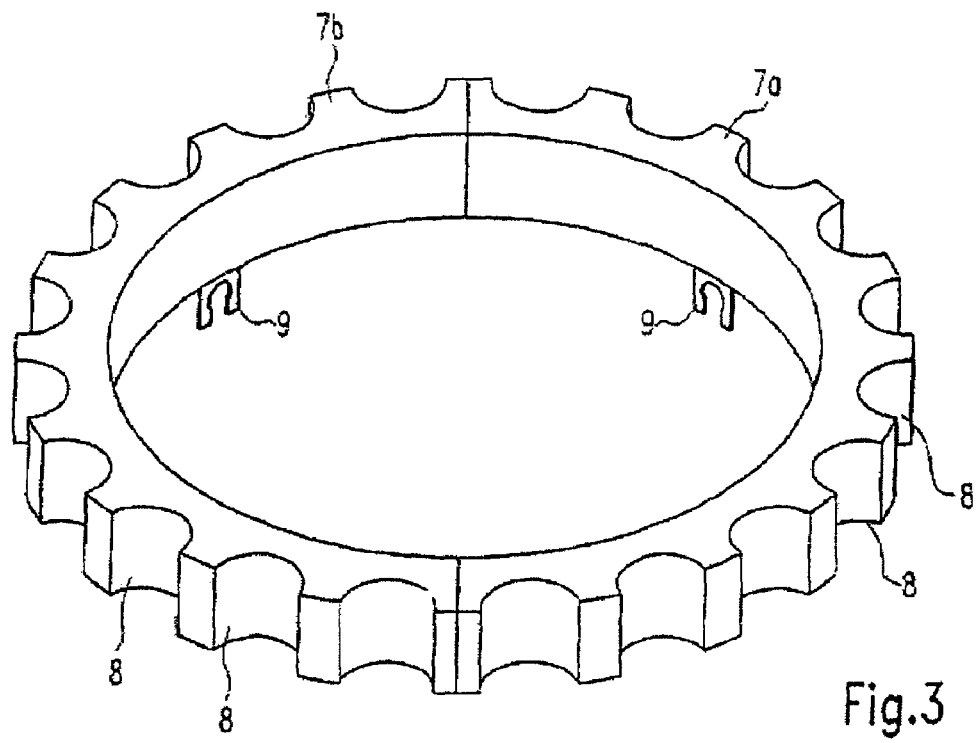
FIG. 3 shows a three-dimensional schematic diagram of two mounting parts.

FIG. 3 shows two mounting parts 7a, 7b, which can be placed on the mounting part holder 1 from FIG. 1. More than two mounting parts may also be provided, e.g., 3, 4, 5 or more, but it is also possible to provide just a single part. Each of the two mounting parts 7a, 7b is independent of the other, but they are shown side by side in FIG. 3, because this corresponds to the position assumed by these parts on the mounting part holder 1 when they are placed there. Each mounting part 7a, 7b has recesses 8, which are provided to hold a bottle body, for example. A first locking element 9 is shown on the underside of the mounting part 7a, 7b. Each mounting part 7a, 7b has three such locking elements 9, but only one is visible.

Figure 4:
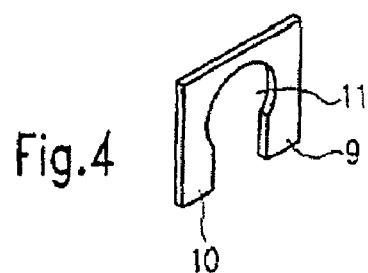
FIG. 4 shows a schematic three-dimensional diagram of a locking element.

FIG. 4 shows an enlarged detail of such a first mounting element 9. It has an essentially U-shaped design 10, but with a widened part 11 in the upper area. The widened part 11 is preferably circular.

Figures 5A, 5B, 5C:
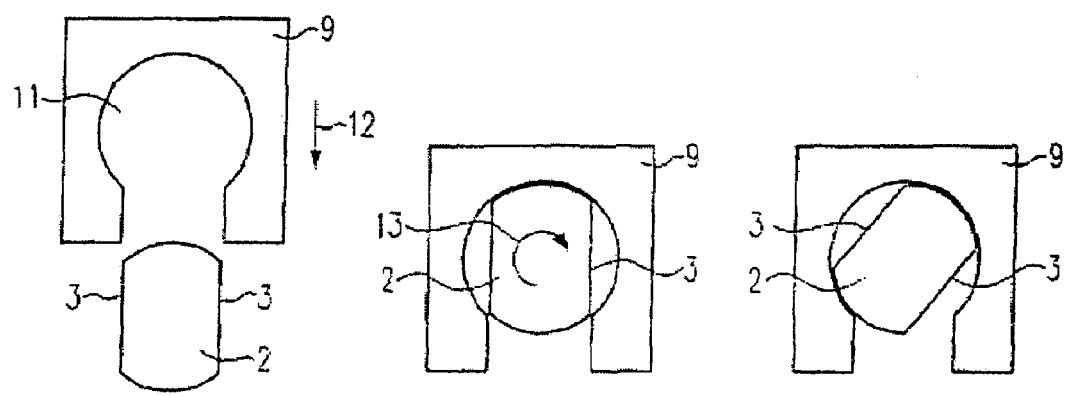
FIG. 5 shows three schematic diagrams of locking elements in different positions in relation to one another.

FIGS. 5a through 5c illustrate the locking of the first locking element 9 and the second locking element 2. With the orientation of the second locking element 2 shown in FIG. 5a, the first locking element 9 in the direction of the arrow 12 may be placed on the second locking element 2. This is possible until the first locking element 9 is situated with its widened part 11 around the second locking element 2 (as depicted in FIG. 5b). By rotation in the direction of the arrow 13, the second locking element 2 can now be locked to the first locking element 9, as depicted in FIG. 5c. As shown in FIGS. 5a through 5c, the second locking element 2 may be introduced into the first locking element 9 merely due to the flattened areas 3. By rotation of the locking element, the flattened area 3 is then aligned, however, so that the second locking element 2 is locked in a form-fitting manner to the first locking element 9.

Figure 6A:
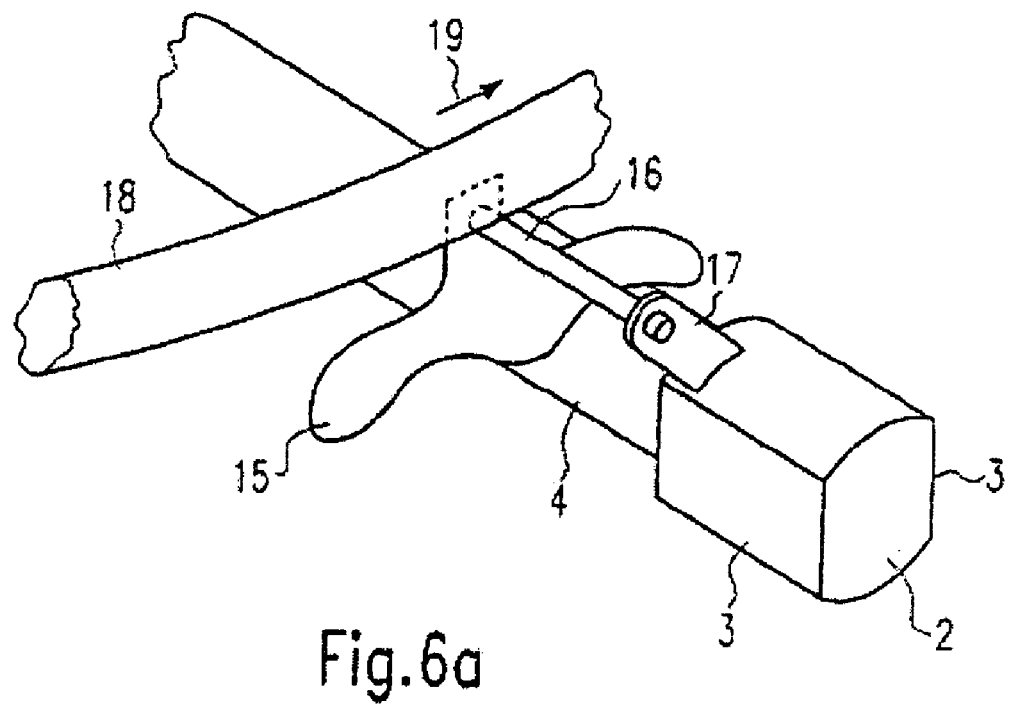
FIG. 6 shows two three-dimensional schematic diagrams of the mounting part holder.
Figure 6B:
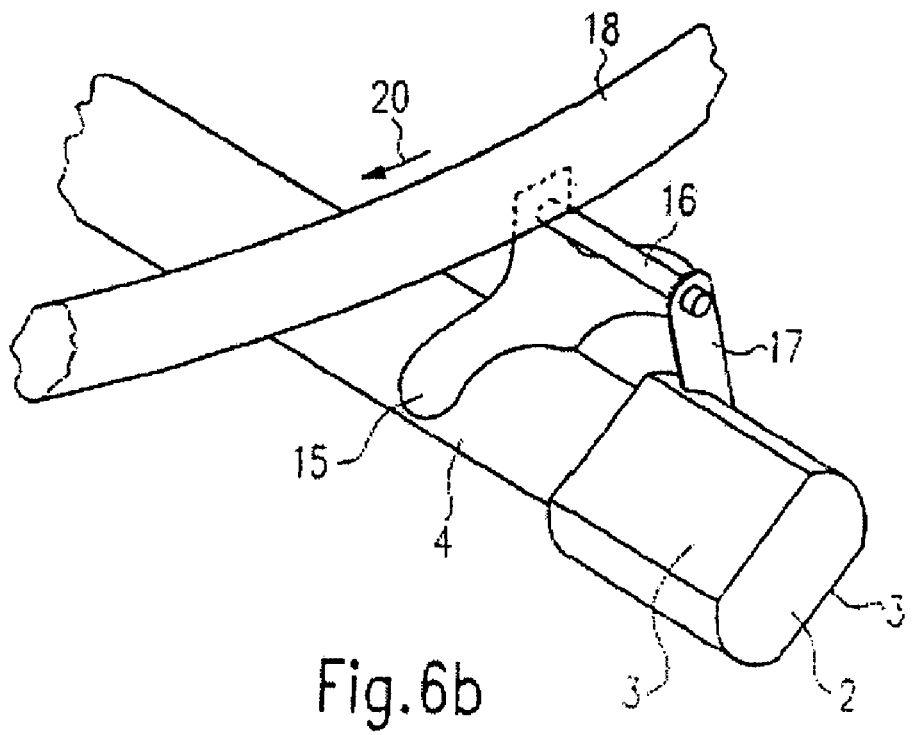

FIGS. 6a and 6b show how the second locking element 2 can be rotated. In FIG. 6a, the second locking element 2 is in the position illustrated in FIGS. 5a and 5b. A lever 17 is arranged on the locking element 2 with a pin 16 engaging rotatably therein. The pin 16 itself is attached to a supporting element 15, which is in turn attached to the operating element 18. The fastening of the pin 16 to the operating element 18 may also be accomplished without a support element 15, e.g., by merely one lever (like lever 17) or the like. The supporting element 15 has two indentations on its underside, with the right indentation resting on the spoke 4. Therefore, the operating element 18 is supported directly on the spoke 4 via the supporting element 15 without applying any load to the mechanics of the pin 16 or the lever 17. Furthermore, rotation of the operating element 18 against the direction of the arrow 19 is prevented.

By rotating the operating element 18 in the direction of the arrow 19, the lever 17 is moved upward, so that the pin 16 is raised slightly with the supporting element 15 and thereby also the operating element 18. Finally, with a further movement in the direction of the arrow 19, the supporting element 15 sits with its left indentation again on the spoke 4. This is depicted in FIG. 6b. The second locking element 2 has rotated due to the movement of the operating element 18 in the direction of the arrow 19, as shown in FIG. 5c.

In this position, the mounting part is thus locked on the mounting part holder.

By rotation of the operating element 18 in the direction of the arrow 20, the locking element 2 may be rotated into the position shown in FIG. 6a, to thereby remove the mounting part 7a, 7b from the mounting part holder 1.

Figure 7:
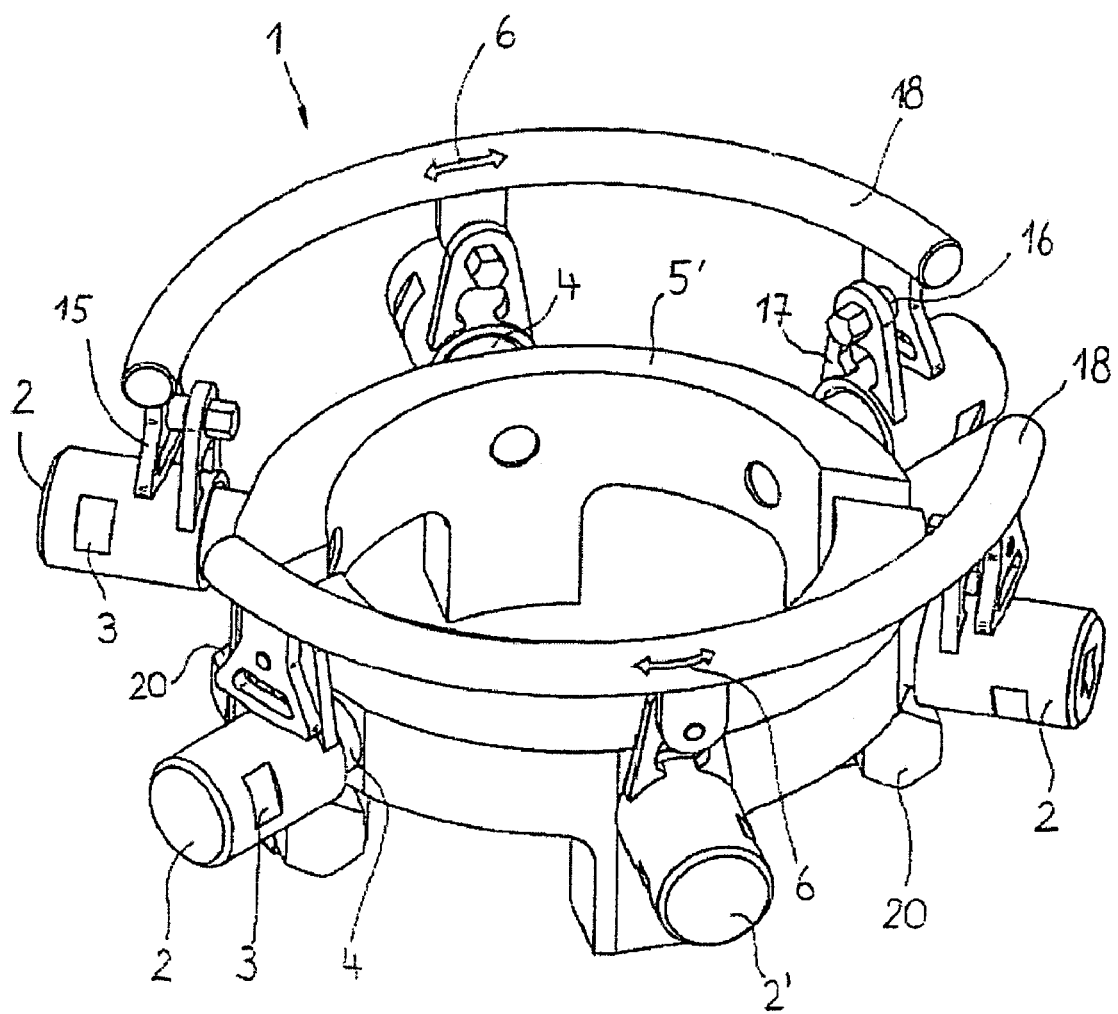
FIG. 7 shows a three-dimensional schematic diagram of the two-part mounting holder.

FIG. 7 shows a two-part mounting part holder 1, which is clamped securely with a form-fitting clamping element 5' with the help of fastening elements 20 on a shaft (not shown here). To facilitate the removal of the two-part mounting part holder 1 from the shaft, the operating element 18 is also designed in two parts. As also shown by the embodiment according to FIGS. 1 through 6, the locking elements 2 which have been provided with flattened areas 3 are attached to the end of spokes 4, which are in turn situated on the form-fitting clamping element 5'. As already explained, the two operating elements 18 are mounted so they can rotate in the direction of the arrow 6 in order to bring the locking elements 2 from a locked position into an unlocked position.

The shaft shown here, to which the two-part mounting part holder 1 is clamped, may be, for example, a central middle post of a can seaming machine. In this case, clamping from the side is especially advantageous because the can seaming machine is not accessible from above due to its function components. Nevertheless, a simple replacement of mounting parts can be performed with this approach.

The locking elements are attached to the spokes 4 by a thread (not shown here), so that they can also rotate for the purpose of locking and unlocking. Fixation is not necessary because otherwise the operating elements 18 could be pulled off the spokes 4 toward the outside together with the locking elements 2. This problem occurs only with divided mounting part holders because the operating element 18 with the locks 2 attached to it is secured in an essentially circular arrangement (see FIG. 1) by its own arrangement.

Furthermore, due to the fixation of the locking elements 2, "wandering" of these elements along the spokes 4 during operation of the operating element is prevented. Movement along the spokes 4 is to be prevented especially in the embodiment according to FIG. 7, because otherwise the flattened areas 3 are displaced with respect to the midpoint of the mounting part holder 1, which results in the mounting parts not being positionable well or at all on the mounting part holder.

The invention claimed is:

1. Transport star, comprising at least one replaceable mounting part with a fixed first locking element, a mounting part holder with a second locking element, and one of the two locking elements (2) is locked to the other locking element (9) by rotation, wherein the second locking element (2) has a circular cross section with a flattened area (3), and the first locking element (9) has a U-shaped receptacle with a widened area (11), where the second locking element (2) fits in the U-shaped receptacle because of the flattened area (3) and can be locked with the first locking element (9) in the area of the widened area (11) by rotation.

2. Transport star according to claim 1, wherein the second locking element (2) can be rotated to lock it.

3. Transport star according to claim 1, wherein the second locking element (2) is one of a socket, a pipe segment or a piece of a shaft that can be rotated about its axis.

4. Transport star according to claim 1, wherein the second locking element (2) is provided on a spoke (4) of the transport star (1).

5. Transport star according to claim 4, wherein the second locking element (2) is provided on the end of the spoke (4).

6. Transport star according to claim 1, wherein the second locking element (2) comprises a lever (17), wherein the transport star further comprises an operating element, and wherein a pin (16) of the operating element (18) can act on the lever (17).

7. Transport star according to claim 6, further comprising a supporting element (15), wherein the operating element (18) is supported on the mounting part holder (1) with the supporting element (15).

8. Transport star according to claim 6, wherein the operating element (18) comprises a ring-shaped grip.

* * * * *